June 24, 1924.                                                                    1,498,746
J. F. O'CONNOR
FRICTION SHOCK ABSORBING MECHANISM
Filed Jan. 31, 1923
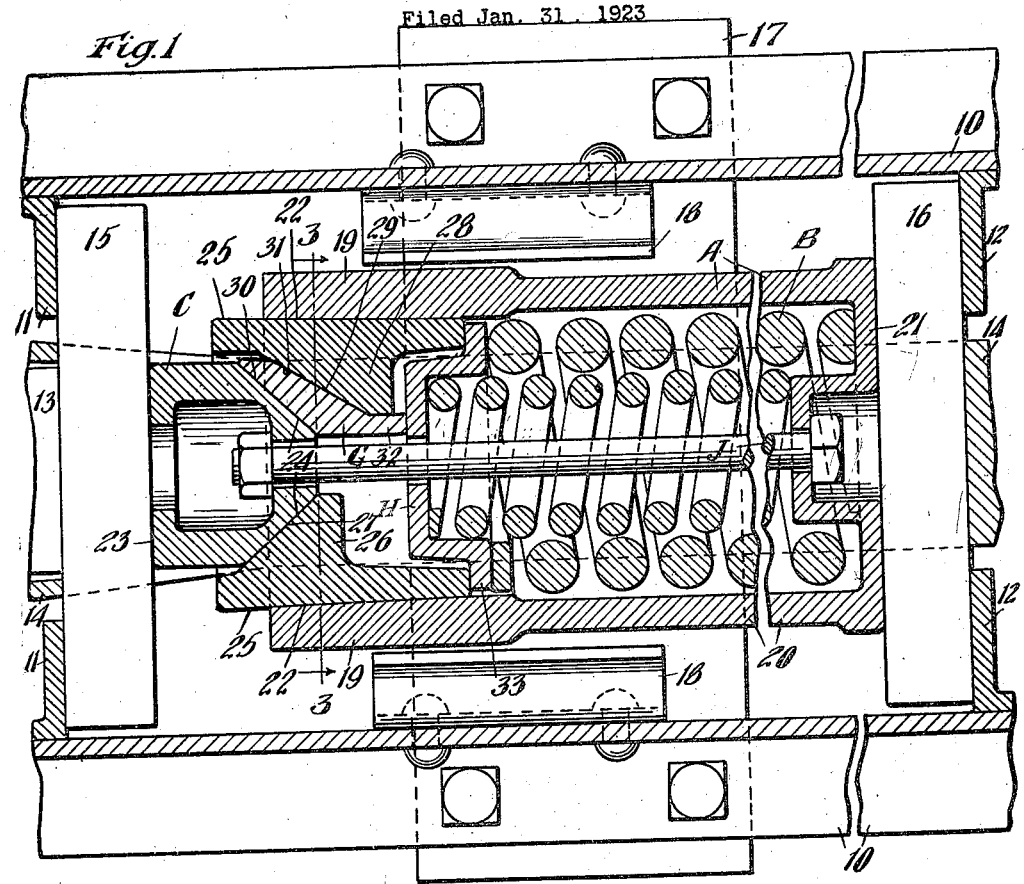
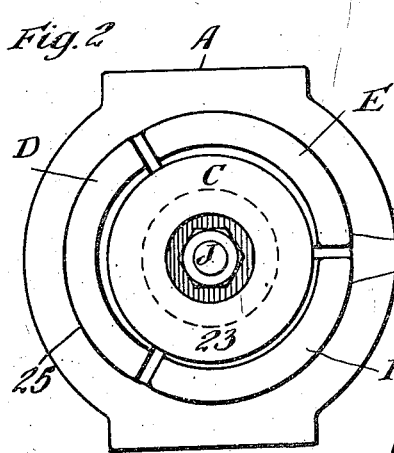
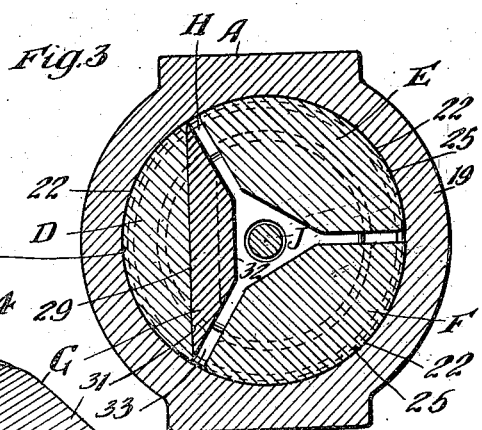
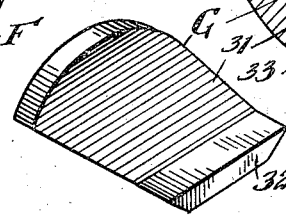
Witnesses
Wm. Geiger
Inventor
John F. O'Connor
By George J. Haight
His Atty Patented June 24, 1924.

1,498,746

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 31, 1923. Serial No. 616,011.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism of that type adapting it to cushion extremely heavy shocks under high speed and, more particularly, such a mechanism which is especially adapted for railway draft riggings.

Another object of the invention is to provide a mechanism of the character indicated, capable of use wherever heavy shocks are to be cushioned, including railway draft riggings, and wherein are obtained high frictional capacity, combined with assured release, the arrangement being such that the high frictional capacity is developed during the compression stroke, by a system of wedge and friction elements having the attributes of a keen angle system, the release and return of the parts to normal position being obtained by the same system of friction units but which has the attributes of a blunt releasing angle wedge system, during the release action.

A more specific object of the invention is to provide a mechanism of the character indicated wherein are employed pressure transmitting means and a plurality of friction shoes, some of the latter having faces inclined to the axis of the mechanism at a different angle from some of the others and by reason of which an unequal travel of the shoes will be induced during a compression stroke, the parts being so arranged, however, with relation to the usual spring resistance that, at the end of the release action, all parts will be automatically restored to their true normal position.

Other objects of the invention will more clearly appear from the description and claims hereinafter following.

In the drawing forming a part of this specification, Figure 1 is a longitudinal sectional view of a portion of a railway draft rigging, the section through the shell and friction elements therewithin corresponding to two planes spaced at approximately 120° apart. Figure 2 is a front end elevational view of the shock absorbing mechanism proper. Figure 3 is a vertical transverse sectional view corresponding to the section line 3—3 of Figure 1. And Figure 4 is a detail perspective of a secondary or auxiliary wedge element employed in my improvement.

In said drawing, 10—10 denote the usual channel draft sills of a car underframe to the inner faces of which are secured front stop lugs 11 and rear stop lugs 12. A portion of the draw bar is indicated at 13, the same being operatively associated with the shock absorbing mechanism proper by a hooded cast yoke 14, within which is disposed said mechanism and front and rear main followers 15 and 16. The yoke and parts therewithin are supported in operative position by a detachable saddle plate 17. The shock absorbing mechanism proper, illustrated in the drawing, is of that type having a cylindrical form throughout its length and to maintain the same in proper position, spacing guides 18—18 are preferably secured to the inner faces of the draft sills.

The improved shock absorbing mechanism proper, as shown, comprises, broadly, a combined friction shell and spring cage casting A; a spring resistance B; a pressure-transmitting block C; three friction-shoes D, E and F; an auxiliary wedge element G; a spring cap or follower H; and a retainer bolt J.

The casting A is of substantially cylindrical form throughout its length, the friction shell proper 19 being formed at the front end of the casting and the spring cage proper 20, rearwardly thereof. The casting is also provided with an integral rear wall 21 abutting the follower 16. While the friction shell proper 19 is of generally cylindrical form on its interior, the same is nevertheless provided with three independent cylindric friction surfaces 22—22, symmetrically arranged with respect to the axis of the shell and each extending through an arc of approximately 120°. The said three cylindric surfaces 22 are converged inwardly of the shell and preferably in such manner that the three cylindric surfaces, at their innermost ends, will merge to form a circle having a radius equal to the radius employed for each of the surfaces 22. In actual practice, the taper of each surface 22 will approximate 3/16 of an inch in 7 inches. In this manner, I am assured of full surface contact at all times between the cylindric friction surfaces of the shell and the corresponding cylindric outer friction surfaces of the shoes, hereinafter described.

The pressure transmitting member C is preferably in the form of a hollow cast block having a front flat transversely extending bearing face 23 engaged by the front follower 15. On its rear or inner side, the member C is formed with three flat faces 24—24, the same being symmetrically arranged with respect to the axis of the shell and extending at a relatively blunt angle with respect to said axis.

The two friction-shoes E and F are of like construction and each is provided on its outer face with a cylindric friction surface 25 extending through an arc of approximately 120° and cooperating with one of the corresponding shell surfaces 22. On its innermost side, each shoe E and F is formed with a lateral enlargement 26 having, on its front side, a flat face 27 cooperating with and inclined at the same angle as the corresponding faces 24 of the member C.

The remaining or third friction-shoe D is provided on its outer side with a cylindric friction surface 25 cooperable with a shell surface 22. On its innermost side nearest the axis of the shell, the shoe D is formed with a lateral enlargement 28, on the front side of which is provided a wedge face 29 extending at a relatively acute angle with respect to the axis of the mechanism.

The auxiliary element G is interposed between the pressure member C and the shoe D. Said element G is provided with a flat face 30 extending at the same angle as and cooperating with the third or remaining face 24 of the member C. On its outer side, the element G is provided with a wedge face 31 extending at the same angle as and cooperating with the wedge face 29 of the shoe D. The element G has also an inwardly extending flange or leg 32, which bears upon the front face of the cup-shaped spring cap H, as clearly shown in Figure 1.

Said spring cap or follower H has an annular flange 33 which, in the normal position of the parts, engages the inner ends of all three shoes D, E and F. The retainer bolt J is anchored at its inner end within a suitable hollow boss formed integral with the casting A, and at its front end, within a suitable recess provided in the member C.

The operation of the mechanism, assuming a buffing movement of the draw bar is as follows, under rapid action. As the pressure-transmitting member C is forced inwardly of the shell, there will be, initially, a slight movement of the wedge element G with respect to the keen angle shoe D on the cooperating wedge faces 29 and 31, due to the inertia of said shoe D and the fact that slippage on the faces 29 and 31 is possible. During this initial action, the two blunt angle shoes E and F will move longitudinally inwardly of the shell substantially in unison with the member C and the same will also be true with respect to the element G considered in connection with the member C. This action is due to the blunt, relatively non-wedging angle of the cooperating sets of faces 24 and 27, between the member C and shoes E and F on the one hand, and the cooperating set of faces 24 and 30 on the member C and element G on the other hand. In this manner, it will be observed that not only is the element G advanced longitudinally with respect to the shoe D, as hereinbefore explained, but also the two shoes E and F will be simultaneously and correspondingly longitudinally advanced with respect to the shoe D. The foregoing described initial action sets up the desired pronounced spreading action.

As the parts continue their movement inwardly of the shell, further slippage between the keen angle faces 31 and 29 is substantially nil, but, due to the taper of the shell surfaces 22, there must be a relative lateral approach of the shoes and this is permitted by the shoes E and F and the element G moving radially inward with respect to the pressure-transmitting member C on the blunt angle faces 24 of the latter, said faces 24 operating in the manner of "safety valves" for this purpose. From the preceding description, it will be seen that, after the initial action above described takes place, the element G and shoe D, together constitute what may be considered, for practical purposes, a shoe having the same construction and characteristics as the two shoes E and F, with this exception that, instead of the inner end of the shoe D remaining in contact with the spring follower or cap H, as is true of the shoes E and F, the point of contact between said spring cap H and, what may be termed the composite shoe D—G, is transferred to the inner end of the element G. In this manner, contact is maintained between the cap H and the shoes E and F through an arc in excess of 180° and contact is maintained between the element G and cap H on the opposite side of the axis to that of the center of the combined contact between the shoes E and F and the cap H. With this arrangement, the cap H is positively maintained perpendicular to the axis of the mechanism, and is positively prevented from tilting, notwithstanding the difference in the longitudinal movement of the shoe proper D on the one hand, and the two shoes E and F on the other hand. While the spring follower or cap H is out of engagement with the inner end of the keen angle shoe D during the compression stroke, as above described, nevertheless it will be apparent to those skilled in the art that the shoe D always affords resistance because of the friction set up between the surface 25 thereof and the shell surface 22, this friction acting to retard the shoe D with gradually increasing force during the compression stroke. The friction shell, being of metal, preferably malleable iron, is capable of a limited amount of radial expansion which takes place during the compression of the mechanism but, with the degree of taper hereinbefore referred to, the expansion does not neutralize the taper and therefore, the differential action described is assured.

Upon removal of the actuating or compressing force, there is an initial releasing action induced by the radial inward contraction of the shell. These forces produce a relative approach toward the center line of the mechanism of the three shoes and element G which, in turn, causes the pressure-transmitting member C to be squeezed out from between the shoes E and F and element G, this action being facilitated by reason of the blunt angle faces 24—27 and 30. The contraction of the shell continues until the shell has either resumed its normal condition, or until the contracting forces have been reduced to a point where the stored up energy in the spring exceeds the longitudinal resistance to release the same. The initial release action, just described, results in loosening the member C sufficiently to permit the reduction of the pressure between the friction surfaces of the shoes and the shell, whereupon the spring becomes effective to commence moving all of the friction elements and element G outwardly of the shell. At the beginning of the outward movement last referred to, the spring follower or cap H will obviously move the two blunt angle shoes E and F in an outward direction and, simultaneously therewith, the element G and, immediately thereafter, the flange of the spring cap will engage the inner end also of the shoe D. The outward movement referred to continues until the member C is limited against further movement by the bolt H. The three shoes will then be forced into their normal position and also the element G.

The arrangement which I have shown is exceedingly efficient in operation, the various friction-shoes and other elements of the friction unit may be made in the form of castings with consequent economy and all of the parts are of heavy, rugged construction, well-adapted to withstand the immense pressure encountered in a device of this character.

While I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell having interior friction surfaces; of a plurality of friction shoes within and cooperating with said shell surfaces; a spring resistance; a pressure-transmitting member; and an auxiliary wedge element interposed between said member and one of said shoes, said member and element and said member and a shoe having cooperating faces inclined to the axis of the mechanism at one angle, said element and a different shoe having cooperating engaging faces inclined at a different angle to the axis of the mechanism.

2. In a friction shock absorbing mechanism, the combination with a friction shell having interior friction surfaces; of a plurality of friction-shoes within and cooperating with said shell surfaces; a spring resistance; a pressure-transmitting member; and an auxiliary wedge element interposed between said member and one of said shoes, said member and element and said member and a shoe having cooperating faces inclined to the axis of the mechanism at a relatively blunt angle, said element and a different shoe having cooperating engaging faces inclined at a relatively acute angle.

3. In a friction shock absorbing mechanism, the combination with a friction shell having interior friction surfaces; of a plurality of friction-shoes within and cooperating with said shell surfaces; a spring resistance; a pressure-transmitting member; an auxiliary wedge element interposed between said member and one of said shoes, said member and element and said member and a shoe having cooperating faces inclined to the axis of the mechanism at one angle, said element and a different shoe having cooperating engaging faces inclined at a different angle to the axis of the mechanism; and a spring follower interposed between said resistance and the friction unit, said shoe having inclined faces engaged by said member and said element having their inner ends bearing upon said spring follower on opposite sides of the center of the follower.

4. In a friction shock absorbing mechanism, the combination with a friction shell having interior friction surfaces; of a plurality of friction-shoes within and cooperating with said shell surfaces; a spring resistance; a pressure-transmitting member; an auxiliary wedge element interposed between said member and one of said shoes, said member and element and said member and a shoe having cooperating faces inclined to the axis of the mechanism at a relatively blunt angle, said element and a different shoe having cooperating engaging faces inclined at a relatively acute angle; and a spring follower interposed between said resistance and the friction unit, said element and said blunt angle shoe having their inner ends bearing upon said follower.

5. In a friction shock absorbing mechanism, the combination with a friction member having a plurality of longitudinally extending friction surfaces; of a plurality of friction-shoes, each having a friction surface cooperable with one of said first named friction surfaces; a spring resistance; a pressure-transmitting member; and an auxiliary wedge element interposed between said pressure member and one of said shoes, said pressure member and element and said pressure member and a shoe having cooperating faces inclined to the axis of the mechanism at one angle, said element and a different shoe having cooperating engaging faces inclined at a different angle to the axis of the mechanism.

6. In a friction shock absorbing mechanism, the combination with a friction member having a plurality of longitudinally extending friction surfaces; of a plurality of friction-shoes, each having a friction surface cooperable with one of said first named friction surfaces; a spring resistance; a pressure-transmitting member; and an auxiliary wedge element interposed between said pressure member and one of said shoes, said pressure member and element and said pressure member and a shoe having cooperating engaging faces inclined to the axis of the mechanism at a relatively blunt releasing angle, said element and an opposed shoe having cooperating engaging faces inclined at a keen wedging angle to the axis of the mechanism.

7. In a friction shock absorbing mechanism, the combination with a friction member having a plurality of longitudinally extending friction surfaces; of a plurality of friction-shoes, each having a friction surface cooperable with one of said first named friction surfaces; a spring resistance; a pressure-transmitting member; an auxiliary wedge element interposed between said pressure member and one of said shoes, said pressure member and element and said pressure member and a shoe having cooperating faces inclined to the axis of the mechanism at one angle, said element and a different shoe having cooperating engaging faces inclined at a different angle to the axis of the mechanism; and a spring follower interposed between said spring resistance and the friction elements, said shoe having engagement with the pressure member and said element having their inner ends bearing on said follower on opposite sides of the center line of the mechanism.

8. In a friction shock absorbing mechanism, the combination with a friction member having a plurality of longitudinally extending friction surfaces; of a plurality of friction-shoes, each having a friction surface cooperable with one of said first named friction surfaces; a spring resistance; a pressure-transmitting member; an auxiliary wedge element interposed between said pressure member and one of said shoes, said pressure member and element and said pressure member and a shoe having cooperating engaging faces inclined to the axis of the mechanism at a relatively blunt releasing angle, said element and an opposed shoe having cooperating engaging faces inclined at a keen wedging angle to the axis of the mechanism; and a spring follower interposed between said resistance and the friction elements, said blunt angle shoe and said element having their inner ends bearing on said follower on opposite sides of the center line of the mechanism.

9. In a friction shock absorbing mechanism, the combination with a friction shell having a plurality of independent interior cylindric friction surfaces converged inwardly of the shell; of a plurality of friction-shoes each having an outer cylindric friction surface cooperating with a shell friction surface; a spring resistance; a pressure transmitting member; and an auxiliary wedge element interposed between said member and one of said shoes, said pressure member and element and said pressure member and a shoe having cooperating engaging faces inclined to the axis of the mechanism at one angle, said element and an opposed shoe having cooperating engaging faces inclined at a different angle to the axis of the mechanism.

10. In a friction shock absorbing mechanism, the combination with a friction shell having a plurality of independent interior cylindric friction surfaces converged inwardly of the shell; of a plurality of friction-shoes each having an outer cylindric friction surface cooperating with a shell friction surface; a spring resistance; a pressure-transmitting member; and an auxiliary wedge element interposed between said member and one of said shoes, said pressure member and element and said pressure member and a shoe having cooperating engaging faces inclined at a relatively blunt releasing angle with respect to the axis of the shell, said element and an opposed shoe having cooperating engaging wedge faces inclined at an acute angle to the axis of the shell.

11. In a friction shock absorbing mechanism, the combination with a friction shell having three interior, independent, cylindric friction surfaces, converged inwardly of the shell; of a spring resistance; three friction-shoes each having an outer cylindric friction surface cooperable with a shell surface, one of said shoes having an inner wedge face inclined at a relatively acute angle to the axis of the shell and the remaining shoes having faces inclined at a relatively blunt angle to the axis of the shell; a spring follower interposed between the resistance and the inner ends of said shoes and normally engaging all three shoes; a pressure-transmitting member having three inwardly converged faces inclined at a relatively blunt releasing angle to the axis of the mechanism and two of which engage the inclined faces of the blunt angle shoes; and an auxiliary wedge element interposed between the keen angle shoe and said pressure transmitting member and having corresponding inclined faces cooperable with the faces of said shoe and member, said element having an inward extension bearing upon said spring follower.

In witness that I claim the foregoing I have hereunto subscribed my name this 25th day of January 1923.

JOHN F. O'CONNOR.

Witnesses:
FRANCES SAVAGE,
HARRIETTE M. DEAMER.